United States Patent
Miyazaki (10) Patent No.: US 10,793,128 B2
(45) Date of Patent: Oct. 6, 2020

(54) VEHICLE BRAKE SYSTEM

(71) Applicant: TOYOTA JIDOSHA KABUSHIKI KAISHA, Toyota-shi, Aichi-ken (JP)

(72) Inventor: Tetsuya Miyazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 15/651,465

(22) Filed: Jul. 17, 2017

(65) Prior Publication Data
US 2018/0072293 A1 Mar. 15, 2018

(30) Foreign Application Priority Data

Sep. 15, 2016 (JP) .................................. 2016-180149

(51) Int. Cl.
| | | |
|---|---|---|
| *B60T 13/66* | (2006.01) | |
| *B60T 7/04* | (2006.01) | |
| *B60T 8/171* | (2006.01) | |
| *B60T 8/172* | (2006.01) | |
| *B60T 8/40* | (2006.01) | |
| *B60T 8/88* | (2006.01) | |
| *B60T 13/68* | (2006.01) | |
| *B60T 13/14* | (2006.01) | |

(52) U.S. Cl.
CPC ............ *B60T 13/662* (2013.01); *B60T 7/042* (2013.01); *B60T 8/171* (2013.01); *B60T 8/172* (2013.01); *B60T 8/4081* (2013.01); *B60T 8/885* (2013.01); *B60T 13/146* (2013.01); *B60T 13/686* (2013.01); *B60T 2220/04* (2013.01); *B60T 2270/413* (2013.01)

(58) Field of Classification Search
CPC .......... B60T 7/042; B60T 8/171; B60T 8/172; B60T 13/662; B60T 2220/04; B60W 30/18109
See application file for complete search history.

(56) References Cited

U.S. PATENT DOCUMENTS

| | | | |
|---|---|---|---|
| 8,364,362 B2 * | 1/2013 | Karlsson ............... | F16D 48/066 701/68 |
| 2008/0300107 A1 * | 12/2008 | Karlsson ............... | F16D 48/066 477/174 |
| 2016/0200295 A1 | 7/2016 | Nishikawa | |

FOREIGN PATENT DOCUMENTS

| | | |
|---|---|---|
| JP | 2002-067910 A | 3/2002 |
| JP | 2015-000582 A | 1/2015 |
| JP | 2015-063151 A | 4/2015 |

* cited by examiner

*Primary Examiner* — Jerrah Edwards
(74) *Attorney, Agent, or Firm* — Oliff PLC (57) ABSTRACT

A vehicle brake system including: a brake operation member to be operated by a driver; a brake device configured to generate a braking force in accordance with an operation of the brake operation member; an operation amount sensor configured to detect an operation amount of the brake operation member; and a controller configured to control the braking force generated by the brake device, wherein the controller determines whether the brake operation member is in an operating state or in a non-operating state and controls, based on the determination, the braking force, and wherein the controller determines that the brake operation member is in the operating state when the operation amount exceeds an operating-state determining threshold and determines that the brake operation member is in the non-operating state when a time not less than a first set time elapses with the operation amount kept less than a non-operating-state determining threshold.

5 Claims, 7 Drawing Sheets

VEHICLE BRAKE SYSTEM

CROSS REFERENCE TO RELATED APPLICATION

The present application claims priority from Japanese Patent Application No. 2016-180149, which was filed on Sep. 15, 2016, the disclosure of which is herein incorporated by reference in its entirety.

BACKGROUND

Technical Field

The following disclosure relates to a vehicle brake system configured to control a braking force generated by a brake device.

Description of Related Art

A known vehicle brake system includes (A) a brake operation member to be operated by a driver, (B) a brake device configured to generate a braking force in accordance with an operation of the brake operation member, (C) an operation amount sensor for detecting an operation amount of the brake operation member, and (D) a controller configured to control the braking force generated by the brake device. In the known brake system, the controller has a state determining portion configured to determine whether the brake operation member is in an operating state (ON state) or in in a non-operating state (OFF state) based on the operation amount detected by the operation amount sensor. The controller controls the braking force based on the determination. In the thus constructed brake system, a threshold for determining the ON state and a threshold for determining the OFF state are preferably made considerably small for generating, without delay, the braking force having an appropriate magnitude in response to the brake operation. In this case, however, with a decrease in the thresholds, hunting tends to occur due to noise of the operation amount sensor, for instance. In a system disclosed in JP-A-2015-63151, hysteresis is provided between a braking force command value used when a stroke amount increases and a braking force command value used when the stroke amount decreases, for preventing hunting.

SUMMARY

In the above system in which hysteresis is provided as described above, the threshold for determining the ON state needs to be made larger than the threshold for determining the OFF state. This results in an increase in idle stroke when the braking operation is started, undesirably influencing an operation feeling in the brake operation as felt by a driver. Thus, the utility of the vehicle brake system is improved by solving the problem. An aspect of the disclosure relates to a vehicle brake system having a high degree of utility.

In one aspect of the disclosure, a vehicle brake system is configured such that (i) a brake operation member is determined to be in an operating state when an operation amount exceeds an operating-state determining threshold and (ii) the brake operation member is determined to be in a non-operating state when a first set time elapses with the operation amount kept less than a non-operating-state determining threshold.

The vehicle brake system constructed as described above effectively prevents or reduces an occurrence of hunting and enables an operating-state determining threshold to be made comparatively small for shortening idle stroke, thereby ensuring a good operation feeling.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

In the following forms, the form (1) corresponds to claim 1. A form in which technical features of the form (2) are added to claim 1 corresponds to claim 2. A form in which technical features of the form (3) are added to claim 1 or 2 corresponds to claim 3. A form in which technical features of the form (5) are added to claim 3 corresponds to claim 4. A form in which technical features of the form (6) are added to claim 4 corresponds to claim 5. A form in which technical features of the form (7) are added to claim 3 corresponds to 6.

(1) A vehicle brake system including: (A) a brake operation member to be operated by a driver; (B) a brake device configured to generate a braking force in accordance with an operation of the brake operation member; (C) an operation amount sensor configured to detect an operation amount of the brake operation member; and (D) a controller configured to control the braking force generated by the brake device, wherein the controller determines whether the brake operation member is in an operating state or in a non-operating state and controls, based on the determination, the braking force generated by the brake device, and wherein the controller determines that the brake operation member is in the operating state when the operation amount exceeds an operating-state determining threshold and determines that the brake operation member is in the non-operating state when a time which is not less than a first set time elapses with the operation amount kept less than a non-operating-state determining threshold.

The vehicle brake system according to this form may have any configuration as long as the braking force generated by the brake device is controllable. For instance, the vehicle brake system may be configured to control the braking force generated by the brake device without depending on an operation force applied to the brake operation member or may be configured to control the braking force generated by the brake device in dependence on both of the operation force applied to the brake operation member and a force generated by an actuator (assist force).

The brake system of this form is based on a configuration in which it is determined whether the brake operation member is in the operating state or in the non-operating state and the braking force is controlled based on the determination. Specifically, the brake system may be configured to control the braking force generated by the brake device or the assist force, during a time period in which the brake operation member is determined to be in the operating state, for instance. Further, the brake system may be configured to generate the braking force determined based on the operation amount, during a time period in which the brake operation member is determined to be in the operating state.

The operating state may be interpreted as a state in which the brake operation is being made by a driver while the non-operating state may be interpreted as a state in which the brake operation is not being made by the driver. Alternatively, the operating state may be interpreted as a state in which generation of the braking force or the assist force is allowed while the non-operating state may be interpreted as a state in which generation of the braking force or the assist force is prohibited. In the brake system constructed as described above, the determination as to whether the brake operation member is in the operating state or in the non-operating state can be appropriately made, so that the braking force that is actually generated can be controlled to have an appropriate magnitude for the operation amount.

The vehicle brake system of this form is characterized by the method for determining whether the brake operation member is in the operating state or in the non-operating state. In the vehicle brake system, even when the operation amount becomes less than the non-operating-state determining threshold, it is not determined that the brake operation member is in the non-operating state until a time which is not less than the first set time elapses, in order to prevent hunting. The first set time is desirably a comparatively long time, as compared with a time pitch of execution of a program, a frequency of noise of the operation amount sensor, and so on. Specifically, the first set time is about 1.0 second, for instance. There has been known a method in which a threshold for determining the operating state (operating-state determining threshold) is made larger than a threshold for determining the non-operating state (non-operating-state determining threshold) in order to prevent hunting, namely, there has been known a method in which hysteresis is provided as described above. In contrast, it is not necessary in the brake system of this form to limit a relationship in level between the operating-state determining threshold and the non-operating-state determining threshold. It is thus possible to make the operating-state determining threshold smaller than that in the system using the conventional method, resulting in shortened idle stroke in the brake operation. That is, the vehicle brake system of this form ensures improved operation feeling, as compared with the system using the conventional method.

As described above, the relationship in level between the operating-state determining threshold and the non-operating-state determining threshold is not limited. For example, a case is considered in which the operating-state determining threshold is smaller than the non-operating-state determining threshold. In this case, the operating state and the non-operating state are repeatedly switched in a situation in which the detected operation amount fluctuates between the operating-state determining threshold and the non-operating-state determining threshold. To prevent such repeated switching, the operating-state determining threshold is preferably not smaller than the non-operating-state determining threshold.

(2) The vehicle brake system according to the form (1), wherein the operating-state determining threshold and the non-operating-state determining threshold are the same value.

In this form, the relationship in level between the operating-state determining threshold and the non-operating-state determining threshold is limited, in other words, the two thresholds are the same value. As mentioned above, in the case Where the operating-state determining threshold is smaller than the non-operating-state determining threshold, the operating state and the non-operating state are repeatedly switched in a situation in which the detected operation amount fluctuates between the operating-state determining threshold and the non-operating-state determining threshold due to noise of the operation amount sensor, for instance. From the viewpoint of preventing such repeated switching, the operating-state determining threshold is preferably not smaller than the non-operating-state determining threshold. From the viewpoint of shortening idle stroke in the brake operation, the operating-state determining threshold is preferably made small. That is, this form is a desirable form that considers those viewpoints.

(3) The vehicle brake system according to the form (1) or (2),
wherein the controller shortens the first set time when the operation amount exceeds a threshold for shortening the first set time which is set to be larger than the operating-state determining threshold, and
wherein the controller returns the first set time to its original value when a time which is not less than a second set time elapses with the operation amount kept less than the non-operating-state determining threshold, the second set time being set to be longer than the shortened first set time.

A case is considered in which the first set time is not shortened. In this case, even if the brake operation made by the driver is already finished, the controller does not determine that the brake operation member is in the non-operating state until the time which is not less than the first set time elapses. In other words, even after the brake operation by the driver was actually finished, the control of the braking force is being executed such that the braking force becomes equal to 0 as a target. Thus, it takes a time before the braking force actually becomes equal to 0 due to the execution of the control. In an instance where it is confirmed that the brake operation was made positively or definitely by the driver and thereafter the brake pedal is returned so as to finish the brake operation, it is preferable to make determination of the non-operating state so as to decrease the braking force quickly to 0 by completing the control of the braking force. According to this form, when the operation amount becomes comparatively large and it is accordingly confirmed that the driver made the braking operation positively, the controller quickly makes determination of the non-operating state in response to returning of the brake operation member, so that the braking force can be quickly made equal to 0.

In the case in which the first set time is not shortened, if the driver again operates the brake operation member before the first set time elapses after the brake operation by the driver was finished, the operating state continues while not being determined to be the non-operating state at all. According to this form, even when the driver again operates the brake operation member after a short time interval, the determination as to whether the brake operation member is in the operating state or in the non-operating state can be appropriately made, so that the braking force is appropriately controlled.

In this form, when the time which is not less than the second set time elapses in a state in which the operation amount is kept less than the non-operating-state determining threshold, the shortened first set time is returned to its original value, and the brake system is returned to a state in which hunting is prevented. The second set time is set to be longer than the shortened first set time, so that the first set time is not returned to its original value before the time which is not less than the second set time elapses and it can be appropriately determined that the brake operation member is in the non-operating state when the shortened first set time elapses.

(4) The vehicle brake system according to the form (3), wherein the second set time is shorter than the first set time before shortened.

As described above, it is desirable that the brake system be quickly returned to the state in which hunting is prevented after the first set time has been shortened. It is thus desirable that the second set time be shorter than the first set time before shortened. In view of this, appropriate limitation as the second set time is added in this form.

(5) The vehicle brake system according to the form (3) or (4), wherein, where the operating-state determining threshold is defined as a first operating-state determining threshold, a second operating-state determining threshold which is larger than the first operating-state determining threshold is set, wherein, when the operation amount exceeds a prohibition threshold, the controller prohibits the determination of the operating state that is to be made on the condition that the operation amount exceeds the first operating-state determining threshold, the prohibition threshold being set to be larger than the first operating-state determining threshold, and wherein, when the operation amount exceeds the second operating-state determining threshold, the controller determines that the brake operation member is in the operating state.

This form is based on the form in which the first set time is shortened when the operation amount exceeds the threshold for shortening the first set time. In such a form, in a situation in which the operation amount detected by the operation amount sensor fluctuates in the neighborhood of the first operating-state determining threshold, for instance, there may be caused a risk that the brake operation member is again determined to be in the operating state immediately after determination of the non-operating state has been made. According to this form, when the operation amount exceeds the prohibition threshold for prohibiting determination at the first operating-state determining threshold and it is confirmed that the brake operation was again made positively or definitely by the driver, for instance, determination of the operating state, which is to be made on the condition that the operation amount exceeds the first operating-state determining threshold, is prohibited. It is consequently possible to obviate the risk that the brake operation member is again determined to be in the operating state immediately after determination of the non-operating state has been made.

In this form, the brake operation member is determined to be in the operating state immediately when the operation amount exceeds the second operating-state determining threshold. That is, this form prevents an occurrence of hunting and, at the same time, enables quick determination of the operating state when it is confirmed that the brake operation was made again positively or definitely by the driver.

(6) The vehicle brake system according to the form (5), wherein the controller cancels the prohibition of the deteruination of the operating state when a time which is not less than a set time elapses with the operation amount kept less than the non-operating-state determining threshold after the controller has prohibited the determination.

This form limits timing of cancellation of the prohibition of the determination of the operating state which is to be made on the condition that the operation amount exceeds the first operating-state determining threshold. In a state in which the determination is prohibited, idle stroke is inevitably long. It is thus desirable to cancel the prohibition at an early stage while preventing the brake operation member from being again determined to be in the operating state immediately after determination of the non-operating state has been made. Here, a case is considered in which the driver again makes the brake operation immediately after determination of the non-operating state has been made. In an instance where a speed of the brake operation made by the driver is high, the driver is less likely to feel that the braking force is insufficient in an idle stroke range of the brake operation. On the contrary, in an instance where the speed of the brake operation made by the driver is low, the driver is likely to feel that the braking force is insufficient in the idle stroke range of the brake operation. In view of this, the "set time" in this form may be set such that determination of the operating state is made when the operation amount exceeds the second operating-state determining threshold, only for the braking operation whose speed is comparatively high.

(7) The vehicle brake system according to the form (3) or (4), wherein, where the operating-state determining threshold is defined as a first operating-state determining threshold, a second operating-state determining threshold which is larger than the first operating-state determining threshold is set, and wherein, even when the operation amount exceeds the first operating-state determining threshold immediately after it has been determined that the brake operation member is in the non-operating state, the controller does not make the determination of the operating state until a time which is not less than a set time elapses, but determines that the brake operation member is in the operating state when the operation amount exceeds the second operating-state determining threshold.

Like the above-indicated form in which the determination of the operating state, which is to be made on the condition that the operation amount exceeds the first operating-state determining threshold, is prohibited, this form obviates the risk that the brake operation member is again determined to be in the operating state immediately after determination of the non-operating state has been made, in the situation in which the operation amount detected by the operation amount sensor fluctuates in the neighborhood of the first operating-state determining threshold. In this form, the brake operation member is determined to be in the operating state immediately when the operation amount exceeds the second operating-state determining threshold. In other words, this form prevents an occurrence of hunting and, at the same time, enables quick determination of the operating state when it is confirmed that the brake operation was made again positively or definitely by the driver.

As in the above-indicated form in which the prohibition of the determination of the operating state is cancelled, it is preferable to early return the brake system to the state in which determination of the operating state is made when the operation amount exceeds the first operating-state determining threshold while preventing determination of the operating state immediately after determination of the non-operating state has been made. As in the above-indicated form in which the prohibition of the determination of the operating state is cancelled, the "set time" in this form may be set such that determination of the operating state is made when the operation amount exceeds the second operating-state determining threshold, only for the braking operation whose speed is relatively high.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Referring to the drawings, there will be explained below in detail embodiments of the claimable invention. It is to be understood that the claimable invention is not limited to the details of the following embodiments and the forms described in Forms of the Invention, but may be changed and modified based on the knowledge of those skilled in the art. It is to be further understood that modifications of the following embodiments can be provided utilizing technical features described in the Forms of the Invention.

[A] Structure of Vehicle Brake System

Structure of Hydraulic Brake System

Figure 1:
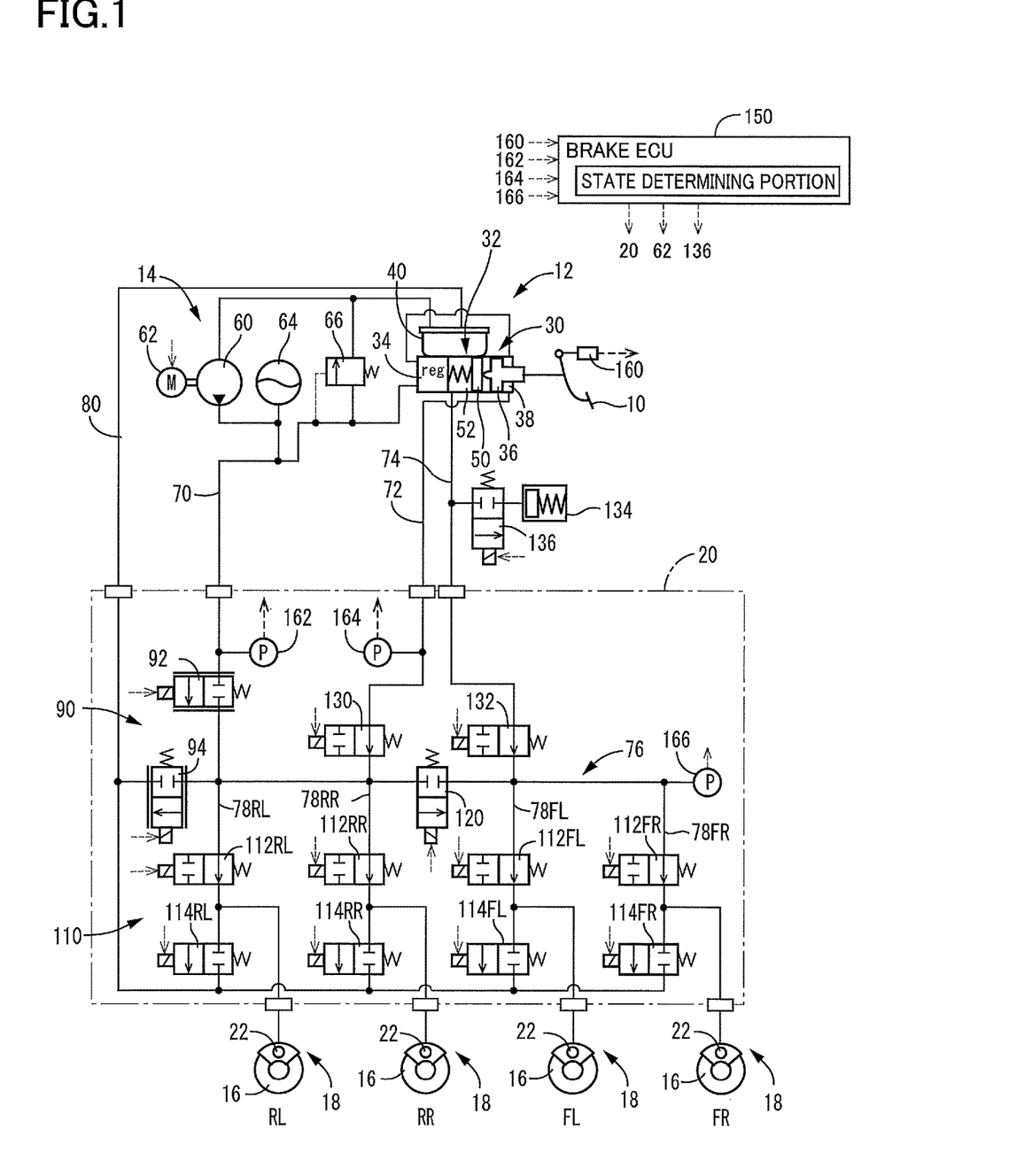
FIG. 1 is a schematic view of a vehicle brake system according to one embodiment of the claimable invention.

A vehicle brake system according to one embodiment of the claimable invention is a hydraulic brake system and includes a brake circuit shown in FIG. 1. The vehicle brake system includes a brake pedal 10 as a brake operation member, a manual hydraulic-pressure source device 12 configured to pressurize a working fluid in dependence on a depression force (pedaling force) applied to the brake pedal 10, a power hydraulic-pressure source device 14 configured to pressurize the working fluid in dependence on a force generated by a power source, four hydraulic brake devices 18 provided for respective four wheels 16, and a brake actuator 20 disposed between the two hydraulic pressure source devices 12, 14 and the brake devices 18 and configured to adjust a pressure of the working fluid generated by the power hydraulic-pressure source device 14. Where it is necessary to distinguish the four wheels 16 in terms of "front", "rear", "right", and "left", the four wheels 16 are indicated as a front right wheel 16FR, a front left wheel 16FL, a rear right wheel 16RR, and a rear left wheel 16RL, respectively. Where it is necessary to similarly distinguish constituent elements, the same affixes "FL", "FR", "RL", "RR" as used for the wheels 16 are used to indicate to which one of the four wheels 16 each of the constituent elements corresponds.

Each of the four brake devices 18 includes a brake cylinder 22 and is configured to operate by a fluid pressure in the brake cylinder 22, so as to give a braking fierce to a corresponding one of the four wheels 16. In the present embodiment, the brake device 18 is a disc brake in which brake pads, each as a friction member, held by a non-rotary body are pressed onto a disc rotor, as a brake rotary body, configured to rotate with the wheel 16, by the fluid pressure in the brake cylinder 22.

The manual hydraulic-pressure source device 12 includes a hydraulic booster 30 and a master cylinder 32. The hydraulic booster 30 includes: a regulator (indicated as "reg" in FIG. 1) 34 configured to generate a fluid pressure higher than that corresponding to an operation force applied to the brake pedal 10; a power piston 36 that operates in coordination with the brake pedal 10; and a booster chamber 38 disposed rearward of the power piston 36. While not illustrated, the regulator 34 includes a spool valve and a pressure regulating chamber. The regulator 34 is connected to the power hydraulic-pressure source device 14 and to a reservoir 40. When the spool valves moves by an operation of the brake pedal 10, the regulated-pressure chamber is selectively brought into communication with one of the power hydraulic-pressure source device 14 and the reservoir 40, so that a pressure of the working fluid in the regulated-pressure chamber is regulated to a level in accordance with a magnitude of the operation force. The working fluid in the regulated-pressure chamber (i.e., the working fluid whose pressure has been regulated by the regulator 34) is supplied to the booster chamber 38, so that there is applied, to the power piston 36, a force that moves the power piston 36 forward and the operation force is thus assisted.

The master cylinder 32 includes a pressurizing piston 50 that operates in coordination with the power piston 36 and a pressurizing chamber 52 disposed forward of the pressurizing piston 50. The forward movement of the power piston 36 causes the pressurizing piston 50 to move forward, so that a fluid pressure is generated in the pressurizing chamber 52.

When the brake pedal 10 is depressed, the power piston 36 is moved forward to cause the pressurizing piston 50 to move forward. The fluid pressure regulated by the regulator 34 in accordance with the operation force is supplied to the booster chamber 38. The pressurizing piston 50 is moved forward by a force that is a sum of the operation force and the assist force (corresponding to the fluid pressure in the booster chamber 38), so that there is generated, in the pressurizing chamber 52, a fluid pressure whose level corresponds to the force. In the present embodiment, the fluid pressure in the regulator 34 and the fluid pressure in the pressurizing chamber 52 are made substantially equal to each other.

The power hydraulic-pressure source device 14 incudes: a pump 60 for pumping up the working fluid from the reservoir 40; a pump motor 62, as the power source, for driving the pump 60; and an accumulator 64 that stores, in a pressurized state, the working fluid ejected from the pump 60. The pump motor 62 is controlled such that a pressure of the working fluid stored in the accumulator 64 is held within a predetermined range. The power hydraulic-pressure source device 14 further includes a relief valve 66 that restricts an ejection pressure of the pump 60 to not higher than a set value, so as to prevent the ejection pressure of the pump 60 from becoming excessively high.

The power hydraulic-pressure source device 14, the regulator 34 of the hydraulic booster 30, and the pressurizing chamber 52 of the master cylinder 32 are connected to the brake actuator 20. More specifically, the power hydraulic-pressure source device 14 is connected to a control pressure passage 70, the regulator 34 of the hydraulic booster 30 is connected to a booster passage 72, and the pressurizing chamber 52 of the master cylinder 32 is connected to a master passage 74. The control pressure passage 70, the booster passage 72, and the master passage 74 are connected to a common passage 76 of the brake actuator 20. The common passage 76 is connected to brake cylinders 22FR, 22FL, 22RR, 22RL respectively provided for the wheels 16FR, 16FL, 16RR, 16RL via respective individual passages 78FR, 78FL, 78RR, 78RL. The common passage 76 is connected also to the reservoir 40 via a low-pressure passage 80.

The brake actuator 20 includes an output-pressure control valve device 90 for adjusting a pressure of the working fluid in the accumulator 64, namely, a pressure of the working fluid output from the power hydraulic-pressure source device 14. The output-pressure control valve device 90 includes: a pressure-increase linear valve 92 provided in the control pressure passage 70 connecting the power hydraulic-pressure source device 14 and the common passage 76; and a pressure-decrease linear valve 94 provided in the low-pressure, passage 80 connecting the common passage 76 and the reservoir 40. The pressure-increase linear valve 92 is configured to control an inflow of the working fluid from the power hydraulic-pressure source device 14 into the common passage 76 while the pressure-decrease linear valve 94 is configured to control an outflow of the working fluid from the common passage 76 into the reservoir 40. For each of the pressure-increase linear valve 92 and the pressure-decrease linear valve 94, a predetermined relationship is set between: a pressure difference between a high-pressure side and a low-pressure side of each valve; and a supply current to be supplied to each valve. A valve-opening pressure of each valve is changeable in accordance with a decrease or an increase of the supply current. Thus, each of the pressure-increase linear valve 92 and the pressure-decrease linear valve 94 can continuously change a supply pressure which is a pressure of the working fluid to be supplied to the common passage 76, by controlling the supply current, whereby the supply pressure can be easily controlled to a desired level.

The brake actuator 20 includes an individual-pressure control valve device 110 configured to adjust a fluid pressure in each of the four brake cylinders 22FR, 22FL, 22RR, 22RL. The individual-pressure control valve device 110 includes: four pressure holding valves 112FR, 112FL, 112RR, 112RL provided in the respective individual passages 78FR, 78FL, 78RR, 78RL; and four pressure-decrease valves 114FR, 114FL, 114RR, 114RL each of which is provided between a corresponding one of the four pressure holding valves 112 and the reservoir 40. Each pressure holding valve 112 is a normally-opened electromagnetic control valve which is placed in an open state when no electric current is supplied to its solenoid and which is configured to increase or hold the fluid pressure in the corresponding brake cylinder 22. Each pressure-decrease valve 114 is a normally-closed electromagnetic control valve which is placed in a closed state when no electric current is supplied to its solenoid and which is configured to decrease the fluid pressure in the corresponding brake cylinder 22.

A communication valve 120 is provided in the common passage 76 between a portion at which the common passage 76 is connected to the right and left front wheels 16FR, 16FL and a portion at which the common passage 76 is connected to the right and left rear wheels 16RR, 16RL. In other words, the communication valve 120 is configured to switch a state of communication of the brake cylinders 22RR, 22RL which respectively correspond to the right and left rear wheels 16RR, 16RL and the brake cylinders 22FR, 22FL which respectively correspond to the right and left front wheels 16FR, 16FL between a communicating state and a shut-off state. The communication valve 120 is a normally-closed electromagnetic control valve which is placed in a closed state when no electric current is supplied to its solenoid. In a normal condition, the communication valve 120 is placed in an open state so as to allow communication between the brake cylinders 22RR, 22RL which respectively correspond to the right and left rear wheels 16RR, 16RL and the brake cylinders 22FR, 22FL which respectively correspond to the left and right front wheels 16FR, 16FL, such that the working fluid from the pressure-increase linear valve 92 is supplied to not only the brake cylinders 22RR, 22RL but also the brake cylinders 22FR, 22FL.

The brake actuator 20 further includes a regulator cut valve 130 provided in the booster passage 72 and a master cut valve 132 provided in the master passage 74. Each of the regulator cut valve 130 and the master cut valve 132 is a normally-opened electromagnetic control valve which is placed in an open state when no electric current is supplied to its solenoid. A stroke simulator 134 is connected to the master passage 74 via a simulator cut valve 136 which is a normally-closed electromagnetic control valve.

The present brake system includes a brake electronic control unit 150 as a controller. The brake electronic control unit 150 will be hereinafter referred to as "brake ECU 150" or "ECU 150" where appropriate. To the ECU 150, the pump motor 62 of the power hydraulic-pressure source device 14, and the electromagnetic control valves 92, 94, 112, 114, 130, 132, 136 of the brake actuator 20 are connected. The ECU 150 controls the pump motor 62 and the electromagnetic control valves, so as to control the fluid pressure in the brake cylinder 22 of each brake device 18. The ECU 150 includes driver circuits for controlling operations of the pump motor 62 and the electromagnetic control valves.

The hydraulic brake system includes sensors each as a device for obtaining parameters for the control. The sensors are connected to the brake ECU 150. Specifically, the sensors connected to the ECU 150 include a stroke sensor 160 as an operation amount sensor for detecting an operation amount of the brake pedal 10, an accumulator pressure sensor 162 provided in the control pressure passage 70 for detecting the pressure of the working fluid in the accumulator 64, a regulator pressure sensor 164 provided in the booster passage 72 for detecting the fluid pressure in the regulator 34 of the hydraulic booster 30 generated in accordance with the operation force applied to the brake pedal 10 by the driver, and a brake cylinder pressure sensor 166 provided in the common passage 76 for detecting the fluid pressure in each brake cylinder 22 by detecting the fluid pressure in the common passage 76.

[B] Control in Brake System

In the present hydraulic brake system, at least one of the power hydraulic-pressure source device 14, the hydraulic booster 30 of the manual hydraulic-pressure source device 12, and the master cylinder 32 of the same 12 is selectively brought into communication with the common passage 76 by controlling the pressure-increase linear valve 92 and the pressure-decrease linear valve 94 of the output-pressure control valve device 90, the regulator cut valve 130, and the master cut valve 132.

In the normal condition, the regulator cut valve 130 and are the master cut valve 132 are closed to shut off a supply of working fluid from the manual hydraulic-pressure source device 12, and the working fluid is supplied from the power hydraulic-pressure source device 14 by controlling a supply current to the solenoid of each of the pressure-increase linear valve 92 and the pressure-decrease linear valve 94. In this instance, the communication valve 120 is opened, and the simulator cut valve 136 is opened. By placing the four pressure holding valves 112 in the open state and placing the four pressure-decrease valves 114 in the closed state, the brake cylinders 22 operate by the working fluid supplied from the power hydraulic-pressure source device 14. The control executed in the normal condition is well known in the art and explained here briefly. When the driver operates the brake pedal 10, a target braking force is determined based on the detection results of the stroke sensor 160 and the regulator pressure sensor 164, and the output-pressure control valve device 90 is controlled to attain the target braking force.

In the brake system, it is determined whether the brake pedal 10 is in an operating state (ON state) or in a non-operating state (OFF state) based on a stroke St of the brake pedal 10 detected by the stroke sensor 160. When the brake pedal 10 is in the ON state, the control described above is executed. While not explained in detail, the target braking force when the brake pedal 10 is depressed is determined in accordance with an increase amount as measured from the operation amount at a time point when the brake pedal 10 is placed in the ON state, and the target braking force when the brake pedal 10 is returning is determined such that the target braking force is decreased according to the relationship between the operation amount and the target braking force when the brake pedal 10 is depressed.

[C] Determination of Operating State and Non-Operating State

Figure 2A:
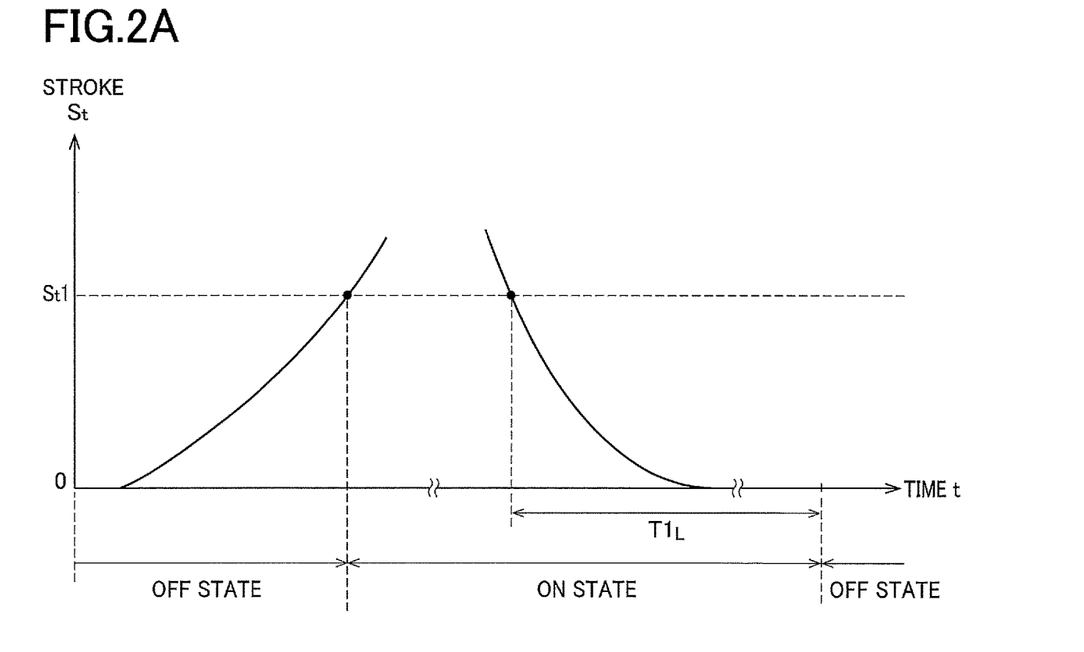
FIGS. 2A and 2B are time charts each showing an example in which an operating state or a non-operating state is determined based on a change in an operation amount.

There will be next explained in detail a method of determining whether the brake pedal 10 is in the ON state or in the OFF state. In a state in which the brake pedal 10 is not operated, it is determined that the brake pedal 10 is in the OFF state. As shown in FIG. 2A, when the brake pedal 10 is depressed and the stroke St detected by the stroke sensor 160 exceeds a first threshold St1 (e.g., about 0.2 mm), it is determined that the brake pedal 10 is in the ON state. On the other hand, when the brake pedal 10 is returned, the stroke St accordingly becomes smaller than the first threshold St1, and a first set time T1($=T1_L$, e.g., 1.0 sec) elapses in this state, it is determined that the brake pedal 10 is in the OFF state. In the brake system of the present embodiment, the first threshold St1 functions as an operating-state determining threshold (first operating-state determining threshold) and functions also as a non-operating-state determining threshold.

Figure 2B:
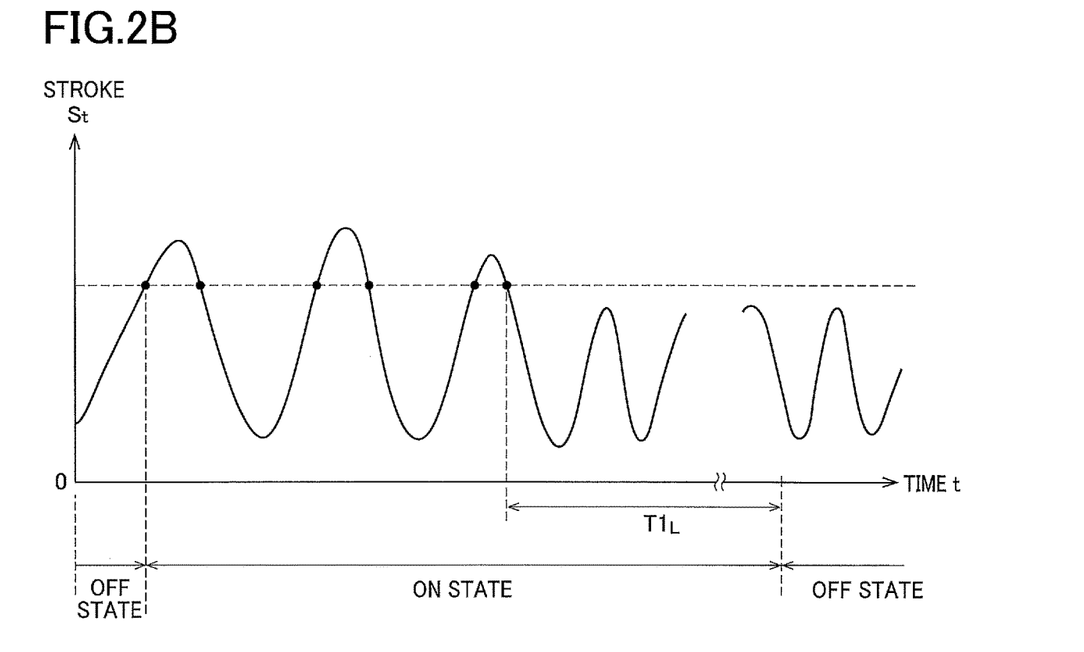

A case is considered in which the detection results of the stroke sensor 160 suffer from noise, as shown in FIG. 2B. Even if the stroke St becomes smaller than the first threshold St1, it is not determined that the brake pedal 10 is in the OFF state unless the first set time $T1_L$ elapses with the stroke St kept less than the first threshold St1. It is thus possible, in the present brake system, to prevent the ON state and the OFF state from being alternately switched at short time intervals, namely, the so-called hunting is prevented.

Some of conventional brake systems are configured to prevent hunting by setting the operating-state determining threshold to be larger than the non-operating-state determining threshold. In such systems, however, idle stroke increases due to the operating-state determining threshold that is set to be larger, undesirably deteriorating an operation feeling as felt by the driver. In the present brake system, determination of the OFF state is made when the first set time $T1_L$ elapses with the stroke St kept less than the first threshold St1, allowing the operating-state determining threshold to be freely set. In the present brake system, the operating-state determining threshold is made equal to the non-operating-state determining threshold and is made smaller than the operating-state determining threshold in the conventional systems.

In this respect, the operating-state determining threshold may be made smaller than the non-operating-state determining threshold. In this case, however, there may arise a risk that the OFF state and the ON state are alternately determined due to noise of the stroke sensor 160 in a situation in which the stroke fluctuates within a range smaller than the non-operating-state determining threshold. In the brake system, the operating-state determining threshold and the non-operating-state determining threshold are the same value, obviating such alternate determination of the OFF state and the ON state.

In an instance where it is confirmed that the brake operation was made positively or definitely by the driver and thereafter the brake pedal 10 is returned and the brake operation is accordingly finished, it is preferable to quickly complete the control of the braking force. In view of this, a process explained below is executed in the present brake system. Thus, determination of the OFF state is not actually made in the manner shown in FIG. 2A in the present brake system. The process will be hereinafter explained in detail.

In the present brake system, when the brake pedal 10 is depressed and it is confirmed that the stroke St exceeds a second threshold St2 (e.g., about 1.0 mm), the first set time T1 is shortened from $T1_L$ to $T1_S$ (e.g., 36 msec). The second threshold St2 is larger than the first threshold St1 and is a value by which it can be determined that the brake operation was made positively or definitely by the driver. Consequently, it is quickly determined that the brake pedal 10 is in the OFF state as shown in FIG. 3A when the brake operation by the driver is finished.

Figure 3A:
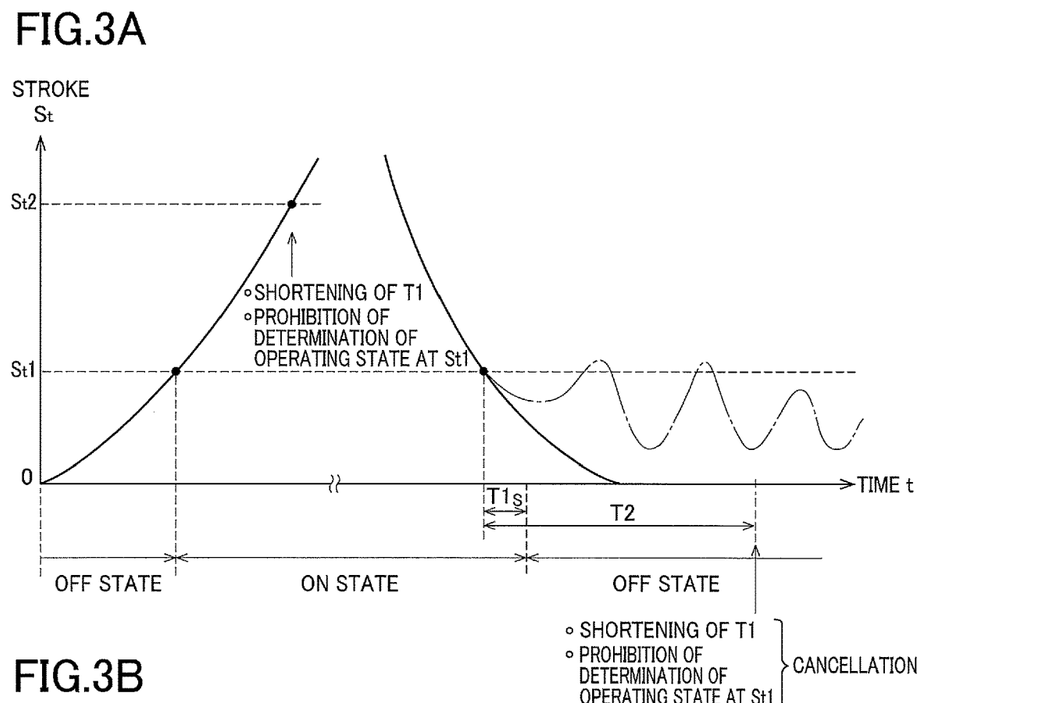
FIGS. 3A and 3B are time charts each showing another example in which the operating state or the non-operating state is determined based on a change in the operation amount.

As indicated by the long dashed short dashed line in FIG. 3A, however, there is a risk that hunting occurs when the stroke St exceeds the first threshold St1 immediately after the OFF state has been determined, in an instance where the driver rests his/her foot on the brake pedal 10, noise is generated in the stroke sensor 160, or the brake pedal 10 rebounds. In the present brake system, therefore, when the stroke St exceeds the second threshold St2, determination of the operating state that is to be made on the condition that the stroke St exceeds the first threshold St1 is prohibited. According to this configuration, even when the stroke St exceeds the first threshold St1 immediately after determination of the OFF state has been made, it is not determined that the brake pedal 10 is in the ON state, thus preventing an occurrence of hunting.

Figure 3B:
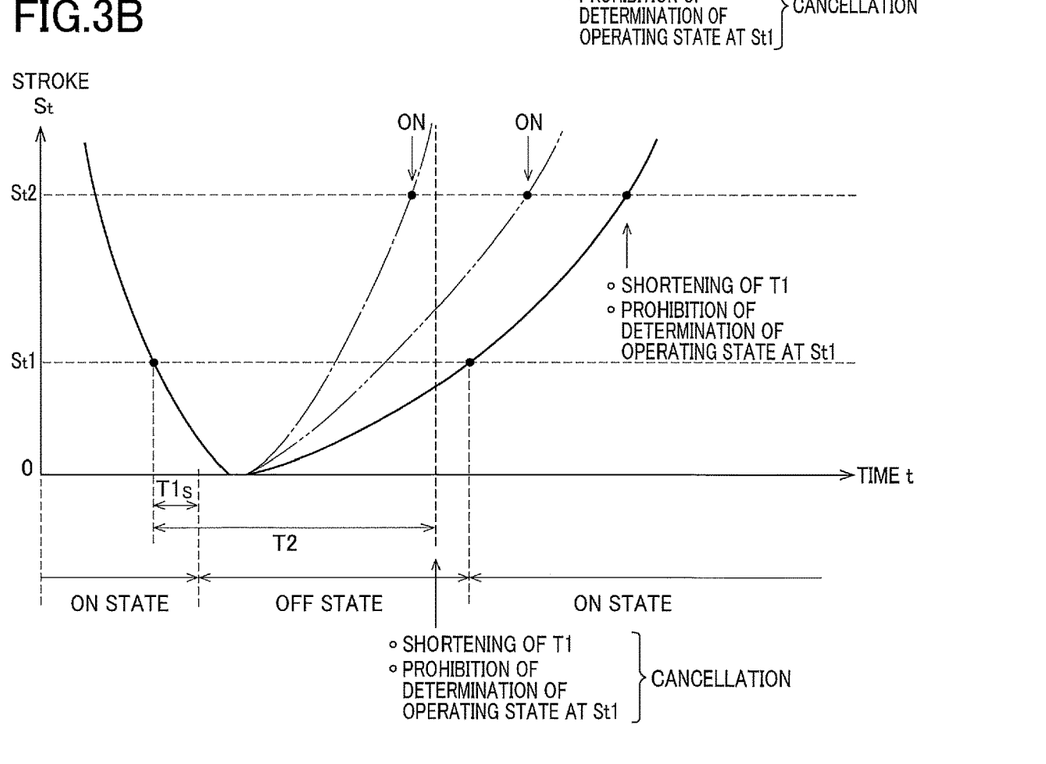

In the above configuration, when the driver again makes the brake operation immediately after the brake pedal 10 has been returned and the OFF state is accordingly determined as shown in FIG. 3B, the ON state is determined as follows. For example, as indicated by the long dashed short dashed line in FIG. 3B, in an instance where the driver again makes the brake operation and the stroke St exceeds the second threshold St2 in a time period during which determination of the operating state at the first threshold St1 is prohibited, it is determined that the brake pedal 10 is in the ON state.

The shortening of the first set time and the prohibition of determination of the operating state at the first threshold St1 are cancelled when a second set time T2 (e.g., 200 msec) elapses in a state in which the stroke St is kept less than the first threshold St1. That is, the first set time T1 is returned to $T1_L$, and determination of the operating state that is to be made on the condition that the stroke St exceeds the first threshold St1 is allowed. In the brake system of the present embodiment, the shortened first set time is returned to its original value and the prohibition is cancelled under the same condition, namely, when the same length of set time elapses. The length of the set time for returning the shortened first set time and the length of the set time for cancelling the prohibition may be mutually different.

In an instance where the operation speed of the brake operation is comparatively low as indicated by the solid line in FIG. 3B, determination of the operating state at the first threshold St1 is allowed before the stroke St reaches the second threshold St2, and the ON state is determined when the stroke St exceeds the first threshold St1.

With an increase in idle stroke upon depression of the brake pedal 10, the driver is more likely to feel the existence of idle stroke. On the other hand, with an increase in the operation speed of the brake operation, the driver is less likely to feel the existence of idle stroke. In view of this, the second set time T2 is set in consideration of the operation speed of the brake operation. More specifically, only for the brake operation whose operation speed is comparatively high, the ON state is determined because of an increase in the stroke St beyond the second threshold St2 in a time period during which determination of the operating state at the first threshold St1 is prohibited. As indicated by the lone dashed double-short dashed line in FIG. 3B, in an instance where the stroke St becomes less than the first threshold St1 and thereafter becomes larger than the first threshold St1 before the second set time T2 elapses, the ON state is determined when the stroke St exceeds the second threshold St2.

As explained above, the second threshold St2 functions as a second operating-state determining threshold, also as a threshold for shortening the first set time, and further as a prohibition threshold for prohibiting determination at the first operating-state determining threshold. These three thresholds may be made mutually different values.

[D] Control Program

Figure 4:
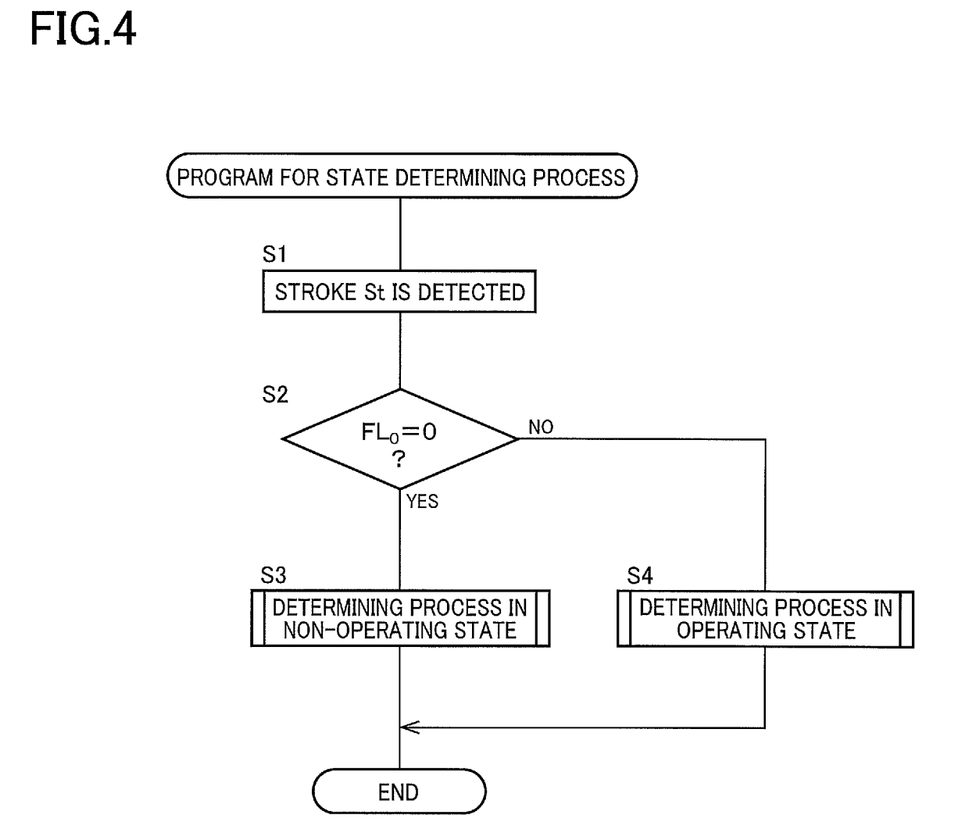
FIG. 4 is a flowchart indicating a program for a state determining process executed by a brake electronic control unit shown in FIG. 1.

The process for determining the ON state or the OFF state is executed such that the ECU 150 executes a program for state determining process indicated by a flowchart of FIG. 4. This program is repeatedly executed at a short time pitch Δt (e.g. several milliseconds).

This program uses a determined-state flag $FL_0$ indicative of whether the brake pedal 10 is in the ON state or in the OFF state and an operation confirmation flag $FL_1$ indicative of whether the brake operation was made positively or definitely by the driver. The flag value of the determined-state flag $FL_0$ is 0 when it is determined that the brake pedal 10 is in the OFF state while the flag value thereof is 1 when it is determined that the brake pedal 10 is in the ON state. The flag value of the operation confirmation flag $FL_1$ is 0 when the stroke St is 0 or small while the flag value thereof is 1 when the stroke St becomes comparatively large and it is accordingly confirmed that the brake operation was made positively or definitely by the driver.

In the program for state determining process, step 1 (hereinafter "step" is abbreviated as "S") is implemented to detect the stroke St by the stroke sensor 160. At S2, the flag value of the determined-state flag $FL_0$ is confirmed. When the flag value is 0, S3 is implemented to execute a determining process in the non-operating state for determining whether the current OFF state is to be continued or to be switched to the ON state. When the flag value is 1, S4 is implemented to execute a determining process in the operating state for determining whether the current ON state is to be continued or to be switched to the OFF state.

Figure 5:
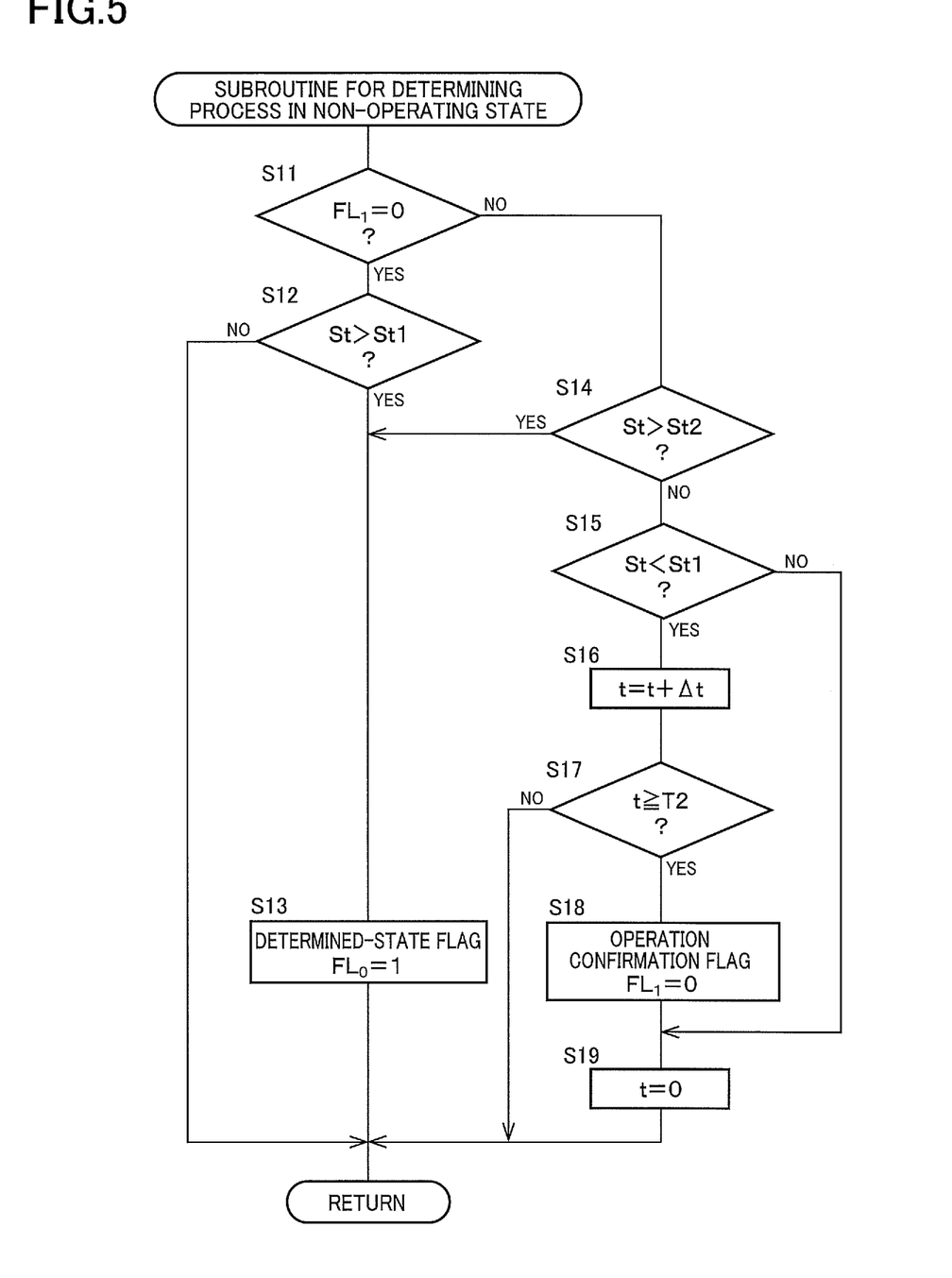
FIG. 5 is a flowchart indicating a subroutine for a determining process in a non-operating state executed in the program for state determining process shown in FIG. 4.

The determining process in the non-operating state is executed by executing a subroutine for the determining process in the non-operating state indicated by a flowchart of FIG. 5. In this subroutine, S11 is initially implemented to confirm the flag value of the operation confirmation flag $FL_1$. When the flag value is 0, it is determined at S12 whether the stroke St is larger than the first threshold St1. When the stroke St is larger than the first threshold St1, it is determined at S13 that the brake pedal 10 is in the ON state, and the flag value of the determined-state flag $FL_0$ is set to 1. When the stroke St is not larger than the first threshold St1, execution of the subroutine ends.

When it is determined at S11 that the flag value of the operation confirmation flag $FL_1$ is 1, it is determined at S14 whether the stroke St is larger than the second threshold St2. When the stroke St is larger than the second threshold St2, it is determined at S13 that the brake pedal 10 is in the ON state, and the flag value of the determined-state flag $FL_0$ is set to 1.

When it is determined at S14 that the stroke St is not larger than the second threshold St2, S15 is implemented to determine whether the stroke St is smaller than the first threshold St1. When the stroke St is smaller than the first threshold St1, S16 is implemented to obtain an elapsed time t after the stroke St has become smaller than the first threshold St1. At S17, it is determined whether the elapsed time t is not less than the second set time T2. When the elapsed time t is not less than the second set time T2, the flag value of the operation confirmation flag, is set to 0 at S18 and the elapsed time t is reset to 0 at S19. When the elapsed time t is less than the second set time T2, S18 and a subsequent step are skipped. When it is determined at S15 that the stroke St is not smaller than the first threshold St1, the elapsed time t is reset to 0 at S19. Thus, execution of the subroutine ends.

Figure 6:
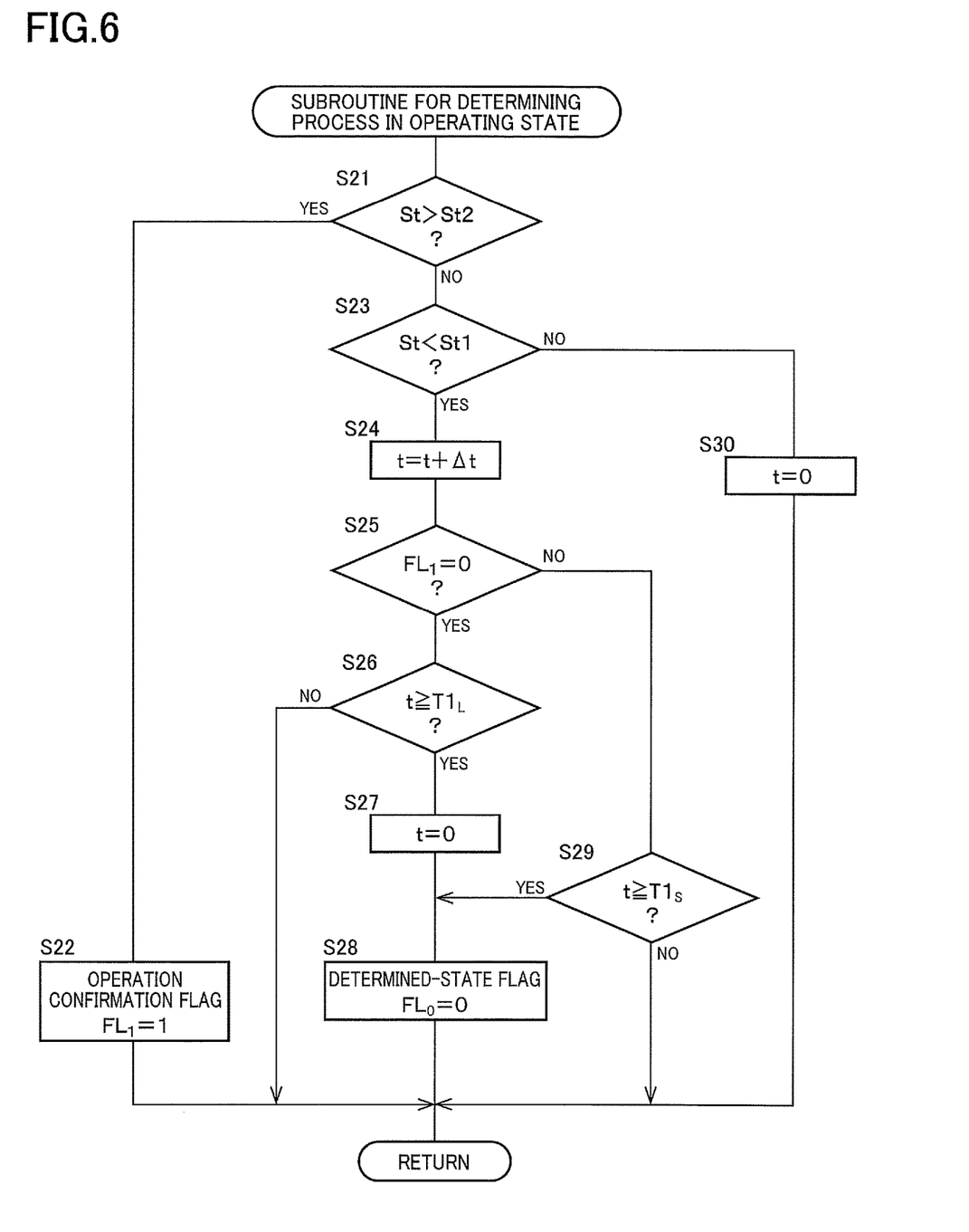
FIG. 6 is a flowchart indicating a subroutine for a determining process in an operating state executed in the program for state determining process shown in FIG. 4.

The determining process in the operating state is executed by executing a subroutine for the determining process in the operating state indicated by a flowchart of FIG. 6. In this subroutine, S21 is initially implemented to determine whether the stroke St is larger than the second threshold St2. When the stroke St is larger than the second threshold St2, the flag value of the operation confirmation flag $FL_1$ is set to 1 at S22.

When it is determined at S21 that the stroke St is not larger than the second threshold St2, S23 is implemented to determine whether the stroke St is smaller than the first threshold St1. When the stroke St is smaller than the first threshold St1, S24 is implemented to obtain an elapsed time t after the stroke St has become smaller than the first threshold St1. At S25, the flag value of the operation confirmation flag $FL_1$ is confirmed. When the flag value is 0, it is determined at S26 whether the elapsed time t is not less than the first set time $T1_L$, which is not shortened. When the elapsed time t is not less than the non-shortened first set time $T1_L$, the elapsed time t is reset to 0 at S27. At S28, it is determined that the brake pedal 10 is in the OFF state, and the flag value of the determined-state flag $FL_0$ is set to 0.

When it is determined at S26 that the elapsed time t is less than the non-shortened first set time $T1_L$, S27 and subsequent steps are skipped.

On the other hand, when it is determined at S25 that the flag value of the operation confirmation flag $FL_1$ is 1, it is determined at S29 whether the elapsed time t is not less than the shortened first set time $T1_S$. When the elapsed time t is not less than the shortened first set time $T1_S$, it is determined at S28 that the brake pedal 10 is in the OFF state, and the flag value of the determined-state flag $FL_0$ is set to 0. When it is determined at S29 that the elapsed time t is less than the shortened first set time $T1_S$, execution of the subroutine ends. When it is determined at S23 that the stroke St is not smaller than the first threshold St1, the elapsed time t is reset to 0 at S30. Thus, execution of the subroutine ends.

When execution of the subroutine for the determining process in the non-operating state or execution of the subroutine for the determining process in the operating state ends, one execution of the program for state determining process ends.

[E] Features of Brake System

In the brake system according to the present embodiment, the ECU 150 as the controller includes a state determining portion 200 configured to determine whether the brake pedal 10 is in the operating state or in the non-operating state. In principle, the state determining portion 200 determines that the brake pedal 10 is in the operating state when the stroke St exceeds the operating-state determining threshold (the first threshold St1) and determines that the brake pedal 10 is in the non-operating state when a time which is not less than the first set time $T1_L$ elapses with the stroke St kept less than the non-operating-state determining threshold (the first threshold St1). According to the configuration, the brake system of the present embodiment effectively prevents an occurrence of hunting and ensures a good operation feeling by making the operating-state determining threshold comparatively small so as to shorten idle stroke.

[E] Modified Embodiment

The brake system of the illustrated embodiment is configured such that, when the stroke St exceeds the second threshold St2 by which it can be determined that the brake operation was made positively or definitely by the driver, the first set time T1 is shortened, whereby it is quickly determined that the brake pedal 10 is in the OFF state when the brake operation by the driver is finished. To prevent an occurrence of hunting that may result from the configuration, the brake system of the illustrated embodiment is configured such that determination of the operating state at the first operating-state determining threshold (the first threshold St1) is prohibited and such that the prohibition of determination of the operating state at the first operating-state determining threshold is canceled when the time which is not less than the set time elapses with the stroke St kept less than the non-operating-state determining threshold (the first threshold St1).

Figure 7A:
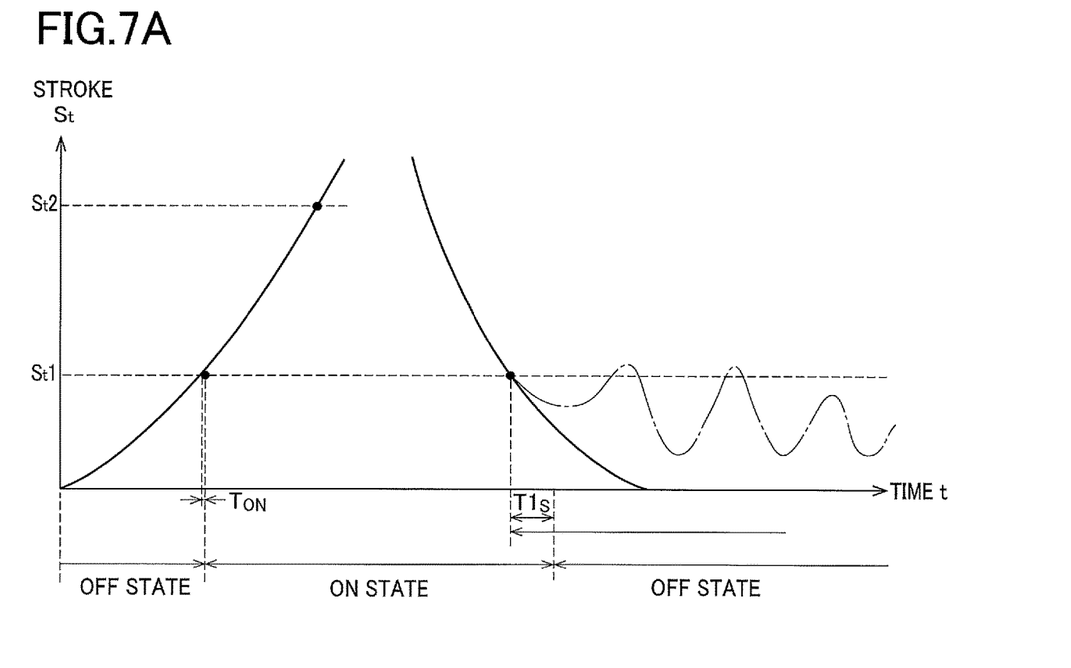
FIGS. 7A and 7B are time charts showing an example in which the operating state or the non-operating state is determined based on a change in the operation amount, in a vehicle brake system according to a modified embodiment.

A brake system according to a modified embodiment differs from the brake system of the illustrated embodiment in a specific method to be taken after the first set time T1 has been shortened for preventing an occurrence of hunting. In the modified embodiment, it is determined that the brake pedal 10 is in the ON state when a time which is not less than a set time $T_{ON}$ elapses in a state in which the stroke St exceeds the first operating-state determining threshold (the first threshold St1). As shown in FIG. 7A, however, the set time $T_{ON}$ is a considerably short time, i.e., 6 msec. (The set time $T_{ON}$ may be 0 sec.) Thus, it may be considered that the set time $T_{ON}$ is not substantially set. The set time $T_{ON}$ is changed to $T_{ON}'$ (e.g., 100 msec) when the stroke St becomes less than the first threshold St1. The changed set time $T_{ON}'$ continues for a set time T3 (e.g., 300 msec).

Figure 7B:
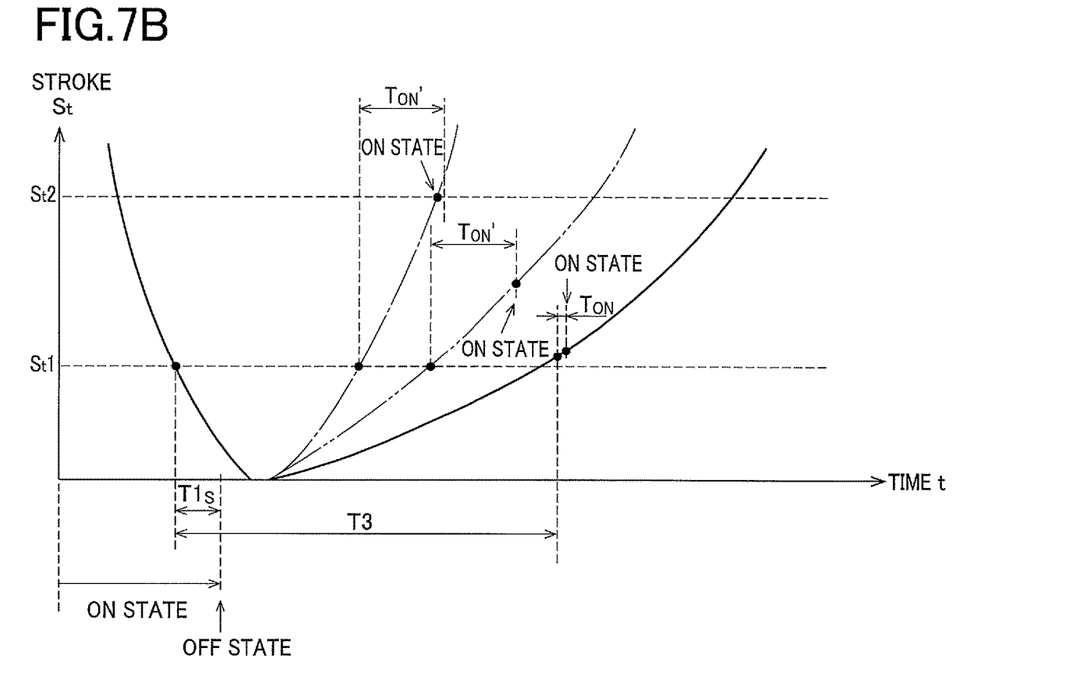

In an instance indicated by the long dashed double-short dashed line in FIG. 7B, it is determined that the brake pedal 10 is in the ON state when a time which is not less than the set time $T_{ON}'$ elapses with the stroke St exceeding the first operating-state determining threshold (the first threshold St1). In an instance indicated by the solid line in FIG. 7B, the set time for determining the ON state is changed from $T_{ON}'$ back to $T_{ON}$ when the set time T3 elapses after the stroke St has become less than the first threshold St1. Because the stroke St already exceeds the first threshold at this time, it is determined that the brake pedal 10 is in the ON state after the set time $T_{ON}$ has elapsed, namely, immediately when the set time T3 has elapsed. An instance indicated by the long dashed short dashed line in FIG. 7B is considered. In this instance, before the set time T3 elapses after the stroke St has become less than the first threshold St1 and before the time which is not less than the set time $T_{ON}'$ elapses with the stroke St exceeding the first threshold St1, the stroke St exceeds the second threshold St2. In this instance, it is determined that the brake pedal 10 is in the ON state immediately when the stroke St exceeds the second threshold St2.

Also in the modified embodiment, even when the driver again operates the brake pedal 10 after a short time interval, the determination as to whether the brake pedal 10 is in the operating state or in the non-operating state can be appropriately made, so that the braking force is appropriately controlled.

What is claimed is:

1. A vehicle brake system including:
(A) a brake pedal configured to be operated by a driver;
(B) a brake device configured to generate a braking force in accordance with an operation of the brake pedal;
(C) an operation amount sensor configured to detect an operation amount of the brake pedal; and
(D) a controller configured to control the braking force generated by the brake device,
wherein:
the controller is configured to determine whether the brake pedal is in an operating state or in a non-operating state, where the brake pedal is determined to be in the operating state when the operation amount exceeds an operating-state determining threshold, and the brake pedal is determined to be in the non-operating state when the operation amount is less than a non-operating-state determining threshold for a duration that is not less than a first set time,
the controller is configured to shorten the first set time when the operation amount exceeds a threshold for shortening the first set time which is set to be larger than the operating-state determining threshold,
the controller is configured to return the first set time to its original value when the operation amount is less than the non-operating-state determining threshold for a duration that is not less than a second set time,
the second set time is set to be longer than the shortened first set time, and
the controller is configured to control, based on the determination, the braking force generated by the brake device.

2. The vehicle brake system according to claim 1, wherein the operating-state determining threshold and the non-operating-state determining threshold are the same value.

3. The vehicle brake system according to claim 1, wherein:

where the operating-state determining threshold is defined as a first operating-state determining threshold, a second operating-state determining threshold which is larger than the first operating-state determining threshold is set, when the operation amount exceeds a prohibition threshold, the controller is configured to prohibit the determination of the operating state that is to be made on the condition that the operation amount exceeds the first operating-state determining threshold, and the prohibition threshold is set to be larger than the first operating-state determining threshold, and when the operation amount exceeds the second operating-state determining threshold, the controller determines that the brake pedal is in the operating state.

4. The vehicle brake system according to claim 3, wherein, after the controller has prohibited the determination of the operating state, the controller is configured to cancel the prohibition of the determination of the operating state when the operation amount is less than the non-operating-state determining threshold for a duration that is not less than a set time.

5. The vehicle brake system according to claim 1, wherein:

where the operating-state determining threshold is defined as a first operating-state determining threshold, a second operating-state determining threshold which is larger than the first operating-state determining threshold is set, and even when the operation amount exceeds the first operating-state determining threshold immediately after the brake pedal is determined to be in the non-operating state, the controller is configured to not make the determination of the operating state until a time which is not less than a set time elapses, but to determine that the brake pedal is in the operating state when the operation amount exceeds the second operating-state determining threshold.

\* \* \* \* \*